United States Patent
Schuermann

Patent Number: 5,451,958
Date of Patent: Sep. 19, 1995

[54] DUAL STANDARD RF-ID SYSTEM

[75] Inventor: Josef Schuermann, Oberhummel, Germany

[73] Assignee: Texas Instruments Deutschland GmbH, Freising, Germany

[21] Appl. No.: 65,972

[22] Filed: May 21, 1993

[51] Int. Cl.6 .................. G01S 13/76; G01S 13/79
[52] U.S. Cl. ........................... 342/42; 342/44
[58] Field of Search ............... 342/42, 44, 50, 51

[56] References Cited

U.S. PATENT DOCUMENTS

| | | | |
|---|---|---|---|
| 4,364,043 | 12/1982 | Cole et al. | 340/825.54 |
| 4,983,976 | 1/1991 | Ogata et al. | 342/42 |
| 5,025,492 | 6/1991 | Viereck | 342/44 |
| 5,053,774 | 10/1991 | Schuermann et al. | 342/44 |
| 5,073,781 | 12/1991 | Stickelbrocks | 342/51 |
| 5,126,745 | 6/1992 | Steinhagen et al. | 342/51 |
| 5,270,717 | 12/1993 | Schuermann | 342/22 |
| 5,287,112 | 2/1994 | Schuermann | 342/42 |
| 5,287,113 | 2/1994 | Meier | 342/51 |
| 5,294,931 | 3/1994 | Meier | 342/44 |
| 5,347,280 | 9/1994 | Schuermann | 342/42 |
| 5,349,357 | 9/1994 | Schurmann et al. | 342/51 |
| 5,351,052 | 9/1994 | D'Hont et al. | 342/42 |
| 5,355,137 | 10/1991 | Schurmann | 342/42 |
| 5,374,930 | 12/1994 | Schurmann | 342/42 |

FOREIGN PATENT DOCUMENTS

| 0324564 | 7/1989 | European Pat. Off. |
| 2636187 | 3/1990 | France |
| WO8403566 | 9/1984 | WIPO |

OTHER PUBLICATIONS

Patent Abstracts Of Japan, vol. 4, No. 168, 20 Nov. 1980 & JP-A-55 114 974 (Japanese National Railways), 4 Sep. 1980.

Patent Abstacts Of Japan, vol. 4, No. 168, 20 Nov. 1980 & JP-A-55 114 975 (Japanese National Railways), 4 Sep. 1980.

*Primary Examiner*—John B. Sotomayor
*Attorney, Agent, or Firm*—Rebecca A. Mapstone; James C. Kesterson; Richard L. Donaldson

[57] ABSTRACT

An object of the invention is to provide a reader which can read transponders having different communication standard protocols with a minimum loss of demodulation speed performance and with the least amount of additional components.

3 Claims, 4 Drawing Sheets

DUAL STANDARD RF-ID SYSTEM

FIELD OF THE INVENTION

This invention generally relates to a dual standard RF-ID system.

BACKGROUND OF THE INVENTION

Many different communication protocals are used in remote RF identification systems today. Some systems use a full duplex communication protocal wherein the interrogator is continuously transmitting an interrogation signal while the transponder in the field is responding. One advantage of this system is that the transponder can be receiving power from the interrogator continuously while it is transmitting its response signal. One variation of the full duplex system uses amplitude modulation where the data return signal of the transponder is similar in frequency to the frequency of the interrogation signal. Another variation uses frequency or phase modulation and data return signals are more different in frequency than the interrogation signal compared to the amplitude modulation case.

Other RF-ID systems use a half-duplex communication protocal wherein the interrogator transmits a powering interrogation signal for a predetermined amount of time and then stops transmitting and listens for a transponder response signal for a predetermined amount of time. Two advantages of this system are that the powering and data transmission phase can be independently optimized and that the interrogation and response signal frequencies can be the same because either the interrogator or the transponder will be transmitting at any given moment, not both. Other advantages are that the transponder signals are stronger and the efficiency is higher which results in less power consumed in the transponder while the interrogation distance is larger. One disadvantage of these systems is that the transponder requires an energy storage device.

A need has arisen for an RF-ID system communication protocal such that one reader, i.e. interrogator, is operable to receive a plurality of transponders response signals, wherein the transponders are operating under different communication protocols. Optimally, the protocol and reader must meet these demands using a frequency protocol for half and full duplex functions with the least amount of additional components and with a minimum loss of demodulation speed performance.

SUMMARY OF THE INVENTION

An object of the invention is to provide a reader which can read transponders having different communication standard protocols with a minimum loss of demodulation speed performance and with the least amount of additional components.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

The half-duplex (HDX) and full duplex (FDX) transponders are tuned to and respond to 134.2 KHz. Full duplex transponders do not generate a response signal of their own but use the interrogation signal directly for powering. The full duplex transponders begin transmitting the identification code response signals back to the interrogator instantaneously. The half-duplex transponders will only charge-up during the exciter signal and then when the exciter signal has terminated, the half-duplex transponders will transmit their own FSK modulated identification code response signals.

Figure 1:
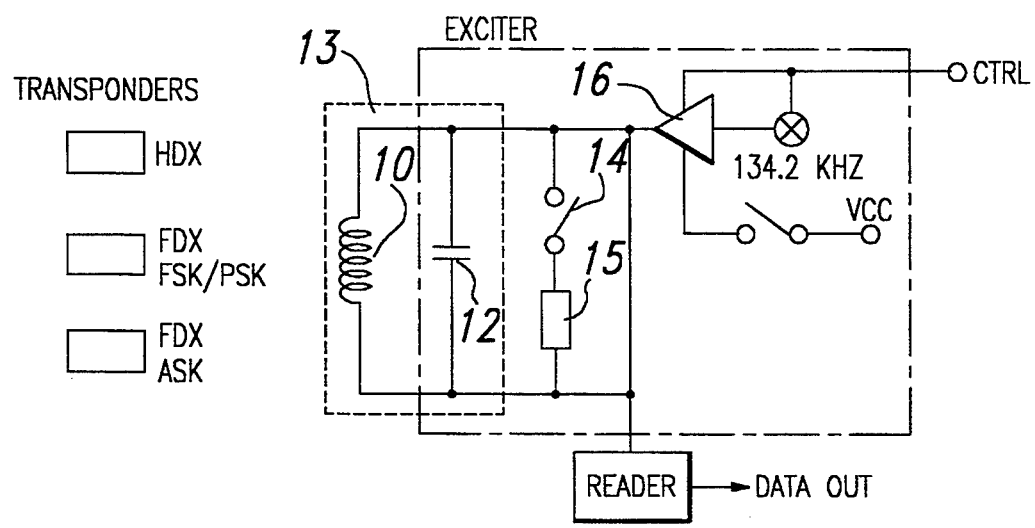
FIG. 1 is a schematic diagram of a reader in a dual standard RF-ID system according to a preferred embodiment of the invention while the reader is transmitting.

In a more detailed description of one embodiment of the invention, the interrogator transmits an interrogation signal or exciter power signal of 134.2 KHz to power up the transponders. Those components of the interrogator that are necessary for the transmission of the interrogation signal are shown schematically in FIG. 1. The control input triggers RF source 18 to produce a 134.2 KHz signal. The 134.2 KHz signal is amplified by amplifier 16 and resonates the antenna resonant circuit comprised of capacitor 12 and coil 10. The 134.2 KHz signal is transmitted via antenna coil 10. If the resonant circuit 10,12 has a high "Q", upon termination of the exciter signal, the switch 14 is closed damping the exciter signal to immediately stop transmission of the exciter signal. If the resonant circuit 10,12 has a low "Q", the exciter signal will not have to be damped, therefore switch 14 will not have to be closed.

Figure 2:
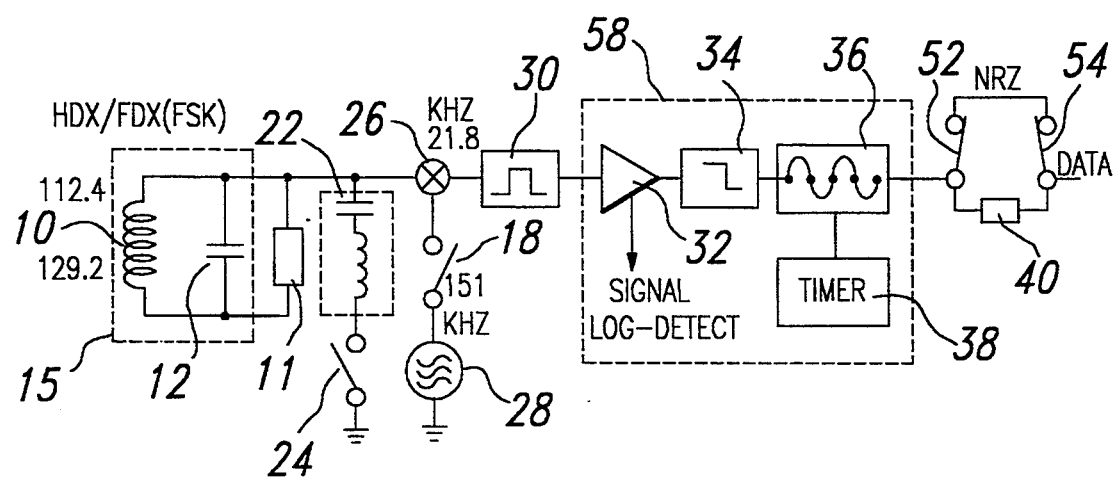
FIG. 2 is a schematic diagram of a receiver in a dual standard HDX/FDX-FSK RF-ID system according to a preferred embodiment of the invention while the reader is receiving in Heterodyne mode.

Those components of the interrogator that are necessary for the reception of the response signals are shown schematically in FIG. 2. The FIG. 2 reader receiver section is able to simultaneously receive the half-duplex frequency shift-keying HDX(FSK) as well as the full-duplex frequency shift-keying FDX(FSK) type transponder identification code response signals. The reception antenna resonant circuit 13 comprises the similar parallel elements of coil 10 and capacitor 12 as the transmission antenna resonant circuit did, but includes a resistor 11 in parallel also. Resistor 11 provides the damping action to the antenna resonant circuit that is necessary to provide a wide bandwidth for the wide range of frequencies to be received. As previously mentioned, first the FDX(FSK) transponder sends it's response signals immediately upon receiving the exciter signal. The FDX(FSK) transponder response signals are received on antenna 10,12 and applied to the input of mixer 9.6. Upon reception of the FDX(FSK) modulated signal frequencies at the RF port of mixer circuit 9.6, the carrier signal frequency of 134.2KHz is also evident at the RF port of mixer circuit 9.6, but at a much higher power level than the FSK modulated signal frequencies. Therefore, in order to not obliterate the FSK signals, a trap circuit 9.9 can be placed in between the antenna resonant circuit 15 and the mixer circuit 9.6 to reduce the amplitude of the carrier signal frequency 134.2 KHz to a level that is more comparable to the amplitude level of the (FDX)FSK response signal frequencies. The trap circuit is enabled during transmission of the exciter signal via switch which is controlled through the same controller (not shown) that operates the exciter signal generator of FIG. 1. The FDX(FSK) response signal is then heterodyned down to the IF frequency of 21.8 KHz via mixer circuit 9.6 which mixes the excitation signal (functioning as L.O.) and the sideband transponder signals (approximately 136 and 132 KHz). The LO port (source 9.8) of mixer 26 lies fallow during the full duplex portion of the RF-ID sequence. The IF frequencies are selectively band filtered out of the range of frequencies coming from the output of mixer circuit by the selective either bandpass or lowpass filter 30. The band filtered signals are then selectively amplified by the signal log-detect circuit 32. The selective amplifier circuit 32 not only amplify the baseband frequency signals post filtering, but can also provide a carrier signal detect output. The signal detect output facilitates an adaptive receiver in which upon the absence of a signal being received, the controller can institute much shorter powering pulse durations from the exciter 18. In this way, the RF-ID sequence duration is minimized with maximum efficiency. Those amplified signals are then amplitude limited by the limiter/comparator circuit 34 followed by the FSK Demodulator 58.

A possible configuration for a demodulator 58 and it's operation follows. A zero detector circuit 36 combined with a timer circuit 38 performs the function of demodulating the baseband signals to determine which bit, respectively the low or high bit FSK frequency, is being sent. According to a preferred embodiment of the invention, an easily integratable ASIC type receiver can be used to perform the demodulation. The demodulation can be performed by determining the number of zero crossings in a given time duration via circuit 36 wherein the timer circuit 38 provides the time base reference. The amount of time elapsed between one zero crossing to another zero crossing will be different for different frequencies, i.e. 124.2 KHz and 134.2 KHz, and therefore the number of zero crossings in the same amount of time will be different for different frequencies. From the output of circuit 36 comes a train of pulses of constant width and various periods, depending upon how many zero crossings were detected, which subsequently gets shaped by a monoflop into a well defined pulse. This well defined pulse is then integrated through an integrator which yields different D.C. levels. A Schmidtt Trigger can be used to distinguish between the two D.C. levels and yield either the high or low FSK bit. The demodulation can also be performed by any conventional demodulator including a Phase-Lock Loop (PLL) or product detector but also Digital Signal Process (DSP) sampling or envelope detection technique can be used. DSP sampling is simple and feasible because the data signal is heterodyned down to a low IF which results in a much lower cost of implementation. A signal (log) detector function 32 can indicate at this point the presence of an FDX(FSK) signal.

Upon the signal-log detector detecting the absence of the FDX(FSK) signal, the receiver is ready to receive the HDX(FSK) transponder signal when switch 18 is triggered to close in order to heterodyne the HDX(FSK) signal down to the same IF frequency (21.8 KHz) as the FDX(FSK) signal by activating LO source 28. During the entire duration that the exciter frequency is being transmitted, the half-duplex transponders are charging up, preparing to respond. The half-duplex transponders respond in response to the termination of the exciter pulse. In addition, the controller has predetermined the exciter duration to correspond with a charge-up of the half-duplex transponders. Therefore, at the end of the exciter duration, the controller closes the delay control switch 24 shown in FIG. 1, such that any residual resonance of the antenna resonant circuit 13 is greatly damped. The significant drop in power level of the exciter signal is detected by the half-duplex (HD) transponders. The Full Duplex (FD) transponders cease responding and the HD transponders, on the other hand, can start responding. The HDX(FSK) transponders, store the energy received from the exciter signal to power the generation of a new carrier signal at the same frequency of the exciter signal, i.e. 134.2 KHz. In addition, a second FSK frequency is generated, i.e. 124.2 KHz such that the transponder identification code is FSK modulated between 134.2 KHz and 124.2 KHz. The HDX(FSK) transponders begin transmitting the FSK modulated response signals almost immediately following the termination of the exciter signal. The HDX(FSK) response signal is received by antenna circuit 10,12 and heterodyned down to 21.8 KHz via mixer 26 which mixes the transponder frequency of 129.2 KHz with LO source 28 of 151 KHz. The baseband signal is then filtered through filter 30 and demodulated through demodulator 58 as previously described. Switches 52 and 54 of the Biphase to NRZ decoder and Non-return-tozero paths, switch from the Biphase to NRZ decoder path to the Non-return-to-Zero path upon the termination of the exciter signal which allows the HD data signals to pass straight through the NRZ path to the data output port. This transition must occur because most of the full-duplex systems use a biphase encoded data signal which has to be decoded via a Biphase to NRZ decoder by the receiver.

Figure 2A:
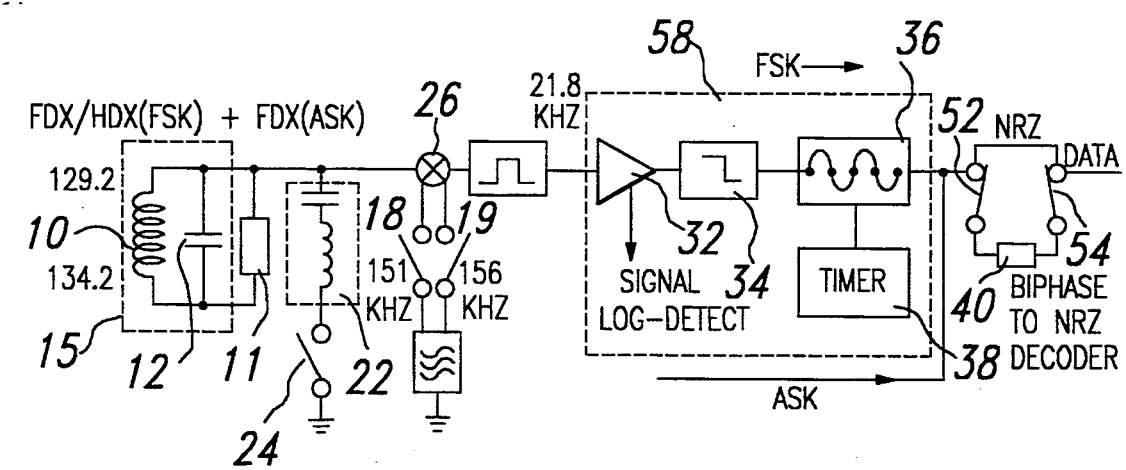
FIG. 2a is an embodiment of a Reader in a multi-standard version to receive HDX(FSK) and FDX(ASK and FSK) signals with a HDX/FDX in Heterodyne mode.

FIG. 2a reader embodiment is operable to receive HDX(FSK) as well as FDX(ASK) and FDX(FSK) transponder signals. Assuming an FDX(FSK) or HD(FSK) signal is received, the receiver functions as described in FIG. 2. In the case of an absence of an FDX(FSK) signal and the presence of an FDX(ASK) signal, the signal log-detect signal from circuit 322 is missing because no FSK signal is received. The absence of the FSK signal activates the LO 156 KHz switch 19 which causes 156 KHz to be mixed with the exciter signal frequency of 134.2 KHz and heterodynes the FDX/ASK signal down to 21.8 KHz. The same control signal which closes switch 19 to activate the 156 KHz LO, closes switch 224 thereby activating a notch filter 22 at midband 134.2 KHz to reduce the excitation signal and allow the amplitude/log ASK detector to operate and demodulate the ASK signal which is connected to the data output terminal. Alternatively or in parallel, a notch filter can be inserted at the output of the mixer to notch out midband 21.8 KHz. If the signals are biphase or e.g. Manchester encoded, an NRZ to biphase decoder circuit 40 can be inserted into the data path. Otherwise the NRZ data passes straight through via the NRZ path as shown in FIG. 2a.

Figure 2B:
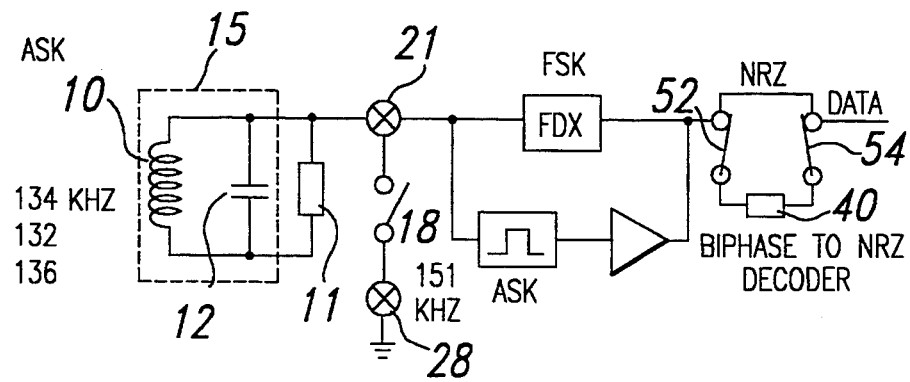
FIG. 2b is an embodiment of a Reader in a multi-standard version to receive HDX(FSK) and FDX(FSK) in a Heterodyne mode and FDX(ASK) in homodyne mode.
Figure 3:
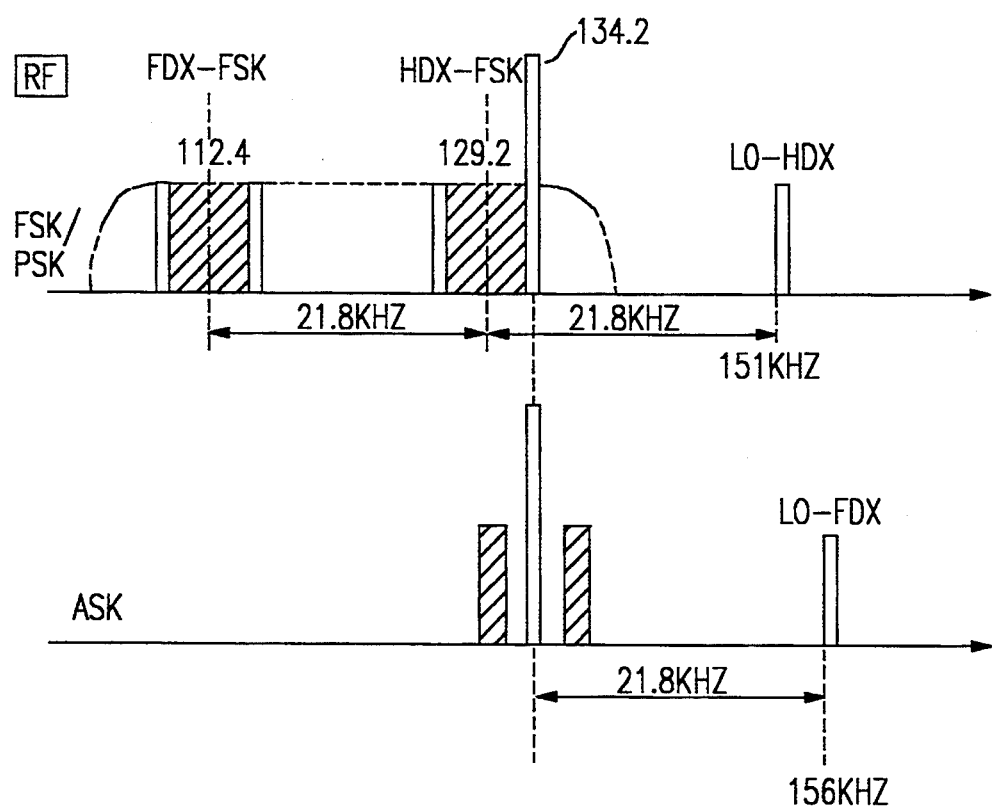
FIG. 3 is a spectrum analysis of the transmitted and received RF signals.
Figure 4:
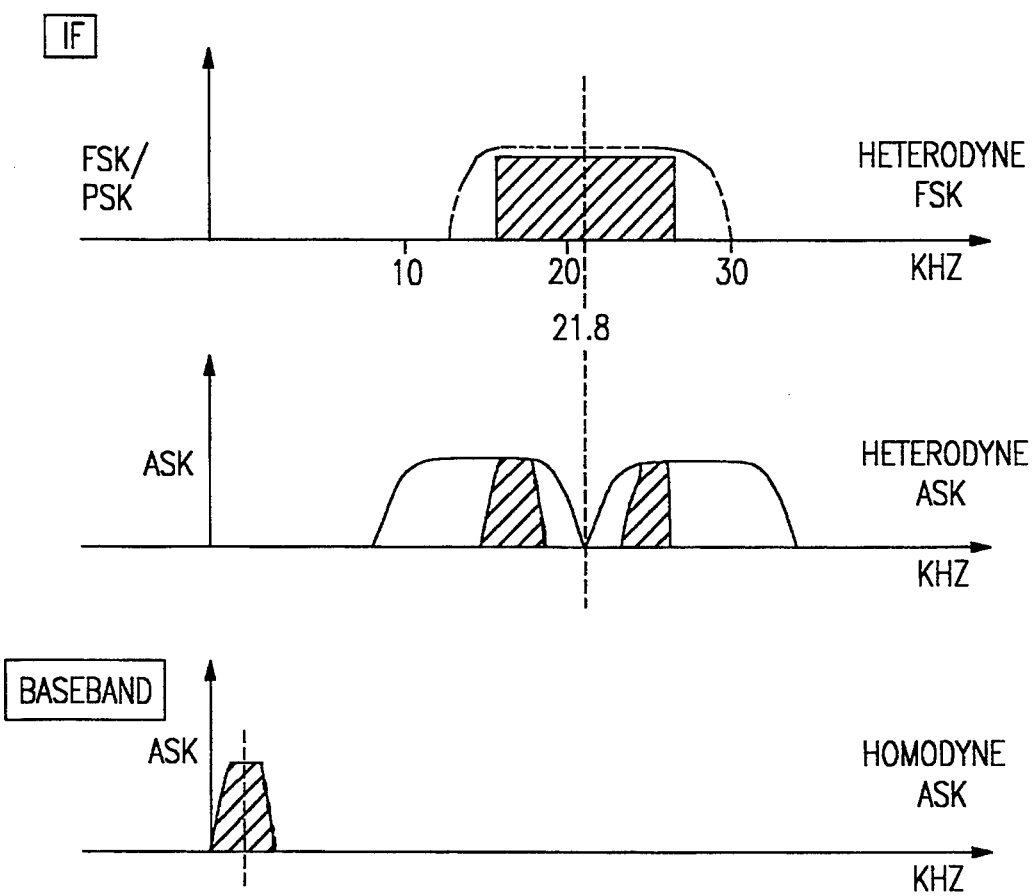
FIG. 4 is a spectrum analysis of the transmitted and received IF signals.

The FIG. 2b shows another reader embodiment combining HDX(FSK), FDX(ASK) and FDX(FSK) reception. The HDX(FSK) and FDX(FSK) functions as described in FIG. 2. The FDX(ASK) demodulation operates as follows. The transponder signal, (sidebands of 134.2 KHz), is received on antenna circuit 10,12, and, in addition to the exciter signal 134.2 KHz, is fed into the RF input of mixer-demodulator 21 and is homodyned down to baseband. Mixer 21 functions as a baseband demodulator in this case, wherein the signal-log detect circuit upon detecting the presence and absence of the signal, is actually demodulating the ASK modulated signal. The demodulated signal is followed by a baseband lowpass or bandpass filter and amplifier. After demodulation the FDX(ASK) data signals are passed through a circuit 40 which can change a bi-phase modulation encoded data signal, e.g. Manchester signal, from bi-phase to a Non-Return-To-Zero (NRZ) binary signal. Once the signals are in Non-Return-to-Zero (NRZ) format, they can be supplied to the logic.

A few preferred embodiments have been described in detail hereinabove. It is to be understood that the scope of the invention also comprehends embodiments different from those described, yet within the scope of the claims.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A dual standard RF-ID protocal system, which can receive and recognize FDX(FSK), HDX(FSK) and FDX(ASK) transponders comprising:

a first antenna circuit for transmitting an excitation pulse to charge-up HD transponders and immediately initiate the FD transponders to respond;
   a second antenna circuit for receiving a transponders RF frequency response signal;
   a mixer circuit which mixes the transponder RF frequency signal with one LO frequency signal and yields a predetermined IF frequency signal;
   an amplifier circuit for amplifying said IF frequency signal and comprising a signal-detect circuit which detects the presence or absence of an FDX(FSK) signal being received;
   an amplitude limiting circuit for amplitude limiting said IF frequency signal; and
   a demodulator circuit for demodulation of said IF frequency signal into a train of pulses having different amplitudes and constant width comprising;
      a zero detector circuit for detecting the number of zero crossings in a predetermined amount of time,
      a timer for defining said predetermined time for said zero detector circuit, and
      wherein said amplitude of said pulses is dependent upon said number of detected zero crossings.

2. The system of claim 1, wherein said demodulator circuit further comprises:
   a monoflop for shaping said pulses into well defined pulses;
   an integrator for integrating said well-defined pulses and for transforming said pulses into two different D.C. levels; and
   a Schmidtt Trigger circuit for distinguishing between said two D.C. levels and yielding either a high or low bit.

3. The system of claim 1, wherein upon receiving a FDX(ASK) transponder signal, said signal-detect circuit detects the absence of said FDX(FSK) signal and thereby triggers activation of another LO frequency signal such that the resulting IF frequency remains the same predetermined IF frequency.

* * * * *